United States Patent Office 3,193,351
Patented July 6, 1965

3,193,351
REMOVAL OF FLUORINE FROM WET PROCESS PHOSPHORIC ACID
Franklyn D. Miller and Earl D. Biggers, Cincinnati, Ohio, assignors to National Distillers and Chemical Corporation, New York, N.Y., a corporation of Virginia
No Drawing. Filed July 5, 1961, Ser. No. 121,834
7 Claims. (Cl. 23—165)

This invention relates to an improved method of removing fluorine from wet process phosphoric acid.

Wet process phosphoric acid, as derived from the acidulation of phosphate rock, generally contains fluorine such that the weight ratio of phosphorus to fluorine (P/F) ranges from about 3.5 to 13. Phosphates derived from wet process phosphoric acids must exhibit a P/F of at least 80, and preferably in excess of 100, to be suitable for use in animal feeds. Various prior art processes have involved treatment of wet process phosphoric acid to reduce the P/F to satisfactory levels.

Several known processes involve the conversion of fluorine to insoluble salts. Inherent in such methods are the loss of appreciable quantities of $P_2O_5$ values in the precipitate, problems in separating the precipitate from the wet process acid, and difficulty in recovering the fluorine values from the precipitate. Other proposed processes involve the adsorption of fluorine from solution by various forms of adsorbents. In addition to requiring appreciable quantities of adbsorbent in relation to the fluorine to be removed, such processes also encounter much the same difficulties accompanying the above mentioned precipitation methods.

Other prior art processes involve volatilization of the fluorine primarily in the form of hydrofluoric acid or silicon tetrafluoride. In the former type of process, superheated steam is passed through the hot phosphoric acid either during the latter stages of concentration or through the concentrated acid. The fluorine is removed by entrainment primarily in the form of hydrofluoric acid. Since hydrofluoric acid tends to polymerize in the vapor state, and, furthermore, is only slightly soluble in water at the normal operating temperature for scrubber equipment, i.e., 100° to 200° F., recovery of fluorine values by this process is highly inefficient.

In the latter type process, concentrated wet process acid, having a boiling point of at least 250° F., is slurried with a silica of an acid-insoluble type and of a specific particle size range to convert the fluorine values to silicon tetrafluoride. Through prolonged boiling and agitation of the slurry, the silicon tetrafluoride is removed by entrainment with water vapor, the concentration of the phosphoric acid solution being regulated by the continuous addition of water. Use of such silicas in the process results in several serious disadvantages. First, the silica is only effective when employed with a wet process acid which has previously been concentrated to a $P_2O_5$ content in excess of about 50 percent, thereby necessitating further boiling of the mixture at temperatures above 250° F. to effect reaction between the silica in colloidal or semi-colloidal form with the fluorides. The inefficiency of reaction of this type of silica further requires the use of large excesses of the silica in relation to the fluorides content. This in turn requires a subsequent and difficult separation of the excess colloidal silica from the defluorinated phosphoric acid slurry.

Accordingly, it is a primary object of this invention to overcome the shortcomings and disadvantages inherent in the processes heretofore known.

It is another object of this invention to provide a process wherein wet process phosphoric acid is more efficiently and more economically defluorinated.

It is a further object of this invention to provide a process wherein defluorination is accomplished during the process of concentrating the acid.

It is still a further object of this invention to provide a process wherein the fluorine is vaporized in a form rendering it easily and efficiently recoverable.

These and other objects of the invention will be apparent to those skilled in the art from the following description.

It has now been discovered that wet process phosphoric acid can be defluorinated by concentrating it to a $P_2O_5$ level above about 50 percent in the presence of a particular type of silica, thereby causing the fluorides to evolve primarily in the form of silicon tetrafluoride.

Wet process phosphoric acid, as produced from the acidulation of phosphate rock with sulfuric acid, generally contains between about 27 percent and about 33 percent $P_2O_5$, about 1 to 3 percent fluorine, about 0.6 percent silica, and some iron and aluminum phosphate impurities. For commercial use, this acid is generally concentrated by evaporation to a $P_2O_5$ content ranging from about 50 percent to about 57 percent. During this concentration process from about 60 to 90 percent of the fluorine originally present comes off in volatile form with the water vapor, leaving a fluorine concentration of about 0.4 to 0.9 percent, based on the concentrated acid. A major portion of the volatilized fluorides is in the form of hydrogen fluoride and silicon tetrafluoride. The concentration step is carried out by heating the phosphoric acid to a temperature of at least 110° C., and preferably within the range of about 115° to 125° C.

The quantity of the subject silicas required to remove sufficient fluorine in a readily recoverable, volatile form to achieve a desired P/F ratio depends upon the amounts of fluorine and silica impurities in the phosphoric acid solution. Although essentially all of the subject silica reacts with fluorine impurities upon addition to the phosphoric acid solution, apparently only a minor portion of the silica originating from the starting phosphate rock is reactive toward fluorine. Generally, the addition of about 0.1 to 2.0% by weight, and more particularly 0.5 to 1.0% by weight of the silica, based on the weight of phosphoric acid solution, is required for achieving a P/F ratio above 100.

The subject silicas are admixed with the wet process phosphoric acid containing from about 27 to 33 percent by weight of $P_2O_5$. The acid is then concentrated by turbulent boiling to a concentrated phosphoric acid having a $P_2O_5$ content ranging from about 50 to 57 weight percent. During the concentration process, the fluorides are converted to, and pass off as, readily recoverable compounds, namely silicon tetrafluoride and hydrofluosilicic acid. These compounds can be readily and efficiently recovered in water at temperatures below the normal boiling point of water.

The silicas suitable for use in the present process are appreciably soluble in a wet process phosphoric acid of the aforedescribed type. These silicas include highly hydrated silicas such as silicic acid, as well as such metasilicates as calcium metasilicate and magnesium metasilicate.

The silica may be contacted with the wet process acid in any of several forms. For example, the silica may be added as a finely divided powder, or be dispersed in water prior to contact with the acid. It may also be contacted with the acid as a solute in the phosphoric acid or some other suitable acid, e.g., sulfuric acid.

The invention will be more fully understood by reference to the following illustrative examples.

*Example I*

*Run A.*—The apparatus comprised an open cylindrical vessel constructed of material inert to reaction with fluorides, a heating tape wrapped around the exterior walls of the vessel and capable of delivering sufficient heat to concentrate the contained acid to about 50 to 60 weight percent of $P_2O_5$, and a Teflon tube inserted so as to deliver a stream of gas below the surface of the liquid during the concentration process.

The reaction vessel was successively charged with 395 grams of wet process phosphoric acid, produced from the acidulation of Florida land pebble rock and containing 28 weight percent $P_2O_5$ and 1.49 weight percent F (P/F=8.3), and 2.0 grams of powdered silicic acid, analyzing 80 weight percent $SiO_2$. Heat was applied and air passed through the solution until enough weight was lost by the solution to yield a concentrated phosphoric acid of about 55 weight percent $P_2O_5$, at which point heating was discontinued. The concentrated acid solution was found by analysis to contain 0.13 weight percent F, giving a P/F=160. A small amount of a phosphatic residue was isolated from the concentrated acid. This residue did not contain silicon.

In this run, a total of 5.7 grams of fluorine was removed from the phosphoric acid solution through introduction of 2.0 grams of acid-soluble silica in the form of silicic acid. According to the reaction

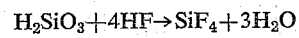

$$H_2SiO_3 + 4HF \rightarrow SiF_4 + 3H_2O$$

a total of 4.8 grams of $H_2SiO_3$ would be required to convert 5.7 grams of F to $SiF_4$. Consequently, since no silicon was found in the residue, it is apparent that all of the added silica reacted with the fluoride, and that a portion of the fluorides was converted to volatile fluorides by silica introduced from the phosphate rock.

*Run B.*—The procedure of Run A was repeated with 395 grams of the same wet process acid except that no silica was introduced into the phosphoric acid solution. The resultant concentrated acid contained 52.1 weight percent $P_2O_5$ and 0.63 weight percent F, giving a P/F=36. Thus, while concentration in the absence of added acid-soluble silica does cause about 90 percent of the fluorides originally present to be driven off, presumably through distillation and/or reaction with silica impurities, the P/F is raised only from about 8.3 to 36, a level far short of animal feed requirements.

*Example II*

*Run C.*—The procedure of Run A was repeated with 400 grams of the same wet process acid, using 5.0 grams of purified, powdered calcium metasilicate. The resultant concentrated acid contained 55.5 weight percent $P_2O_5$ and 0.14 weight percent F, giving a P/F=173.

*Run D.*—The procedure of Run A was repeated with 400 grams of the same wet process acid, using 7.5 grams of purified, powdered aluminum silicate. The resultant concentrated acid contained 51.6 weight percent $P_2O_5$ and 0.59 weight percent F, equivalent to a P/F=38. This illustrates the inoperability of an acid-insoluble silica to remove fluorides by utilizing the present process.

*Run E.*—The procedure of Run A was repeated with 400 grams of the same wet process acid using 3.0 grams of a diatomaceous earth powder. The resultant concentrated acid contained 53.2 weight percent $P_2O_5$ and 0.33 weight percent F, equivalent to a P/F=70. This example illustrates another type of acid-insoluble material which fails to yield a satisfactory P/F ratio by utilizing the present process.

The above data show that the process of this invention can be effectively employed to increase the P/F weight ratios of wet process phosphoric acid to values above 80 and usually above 100 and even higher. In general, the process encompasses concentrating the crude phosphoric acid (about 27 to 33 percent $P_2O_5$) obtained from the acidulation of phosphate rock in the presence of silicic acid, calcium metasilicate or magnesnium metasilicate to recover a phosphoric acid product (about 50 to 57 percent $P_2O_5$) having a P/F weight ratio at least above 80. The ability to treat the crude phosphoric acid with the silica material without a prior preconcentration step is another important feature of this invention.

While particular embodiments of this invention are shown above, it will be understood that the invention is obviously subject to variations and modifications without departing from its broader aspects.

What is claimed is:

1. A method for increasing the P/F weight ratio and concentration of crude, wet phosphoric acid having a $P_2O_5$ concentration of about 27 to 33 percent by weight and a P/F weight ratio of about 3.5 to 13, which comprises heating at a temperature between about 110° and 125° C. said crude phosphoric acid in the presence of added silica material in the amount of 0.1 to 2% by weight selected from the group consisting of silicic acid, calcium metasilicate and magnesium metasilicate, but in the absence of added water for maintaining the initial $P_2O_5$ concentration of said crude phosphoric acid, to obtain a phosphoric acid product having a $P_2O_5$ concentration of greater than about 50 percent by weight and P/F weight ratio of at least 80.

2. The method of claim 1 wherein said silica material is silicic acid.

3. The method of claim 1 wherein said silica material is calcium metasilicate.

4. The method of claim 1 wherein said silica material is magnesium metasilicate.

5. The method of claim 1 wherein said heating is carried out at a temperature of about 115° to 125° C. and for a time sufficient to concentrate the phosphoric acid to greater than 50% by weight.

6. The method of claim 1 wherein said phosphoric acid product has a $P_2O_5$ concentration of from about 50 to 57 percent by weight.

7. The method of claim 1 wherein said phosphoric acid product has a P/F weight ratio of at least 100.

References Cited by the Examiner

UNITED STATES PATENTS

| | | | |
|---|---|---|---|
| 2,044,774 | 6/36 | Curtis | 71—44 |
| 2,123,785 | 7/38 | Knox et al. | 23—165 |
| 2,132,349 | 10/38 | Booth | 23—165 |
| 2,220,575 | 11/40 | Luscher | 71—44 |
| 2,364,015 | 11/44 | Winding | 23—110 X |
| 2,446,978 | 8/48 | Maust | 23—108 |
| 2,565,351 | 8/51 | Butt | 71—47 |
| 2,739,952 | 3/56 | Linville | 260—46.5 |
| 2,987,376 | 6/61 | Gloss | 23—165 |

OTHER REFERENCES

Mellor, "Comprehensive Treatise on Inorganic and Theoretical Chemistry," vol. 6, pages 390–393 and 347–350.

Vail, "Soluble Silicates," vol. I, pages 208 and 227.

MAURICE A. BRINDISI, *Primary Examiner.*